(No Model.) 2 Sheets—Sheet 1.
J. K. SAX.
CAR WHEEL.
No. 319,511. Patented June 9, 1885.
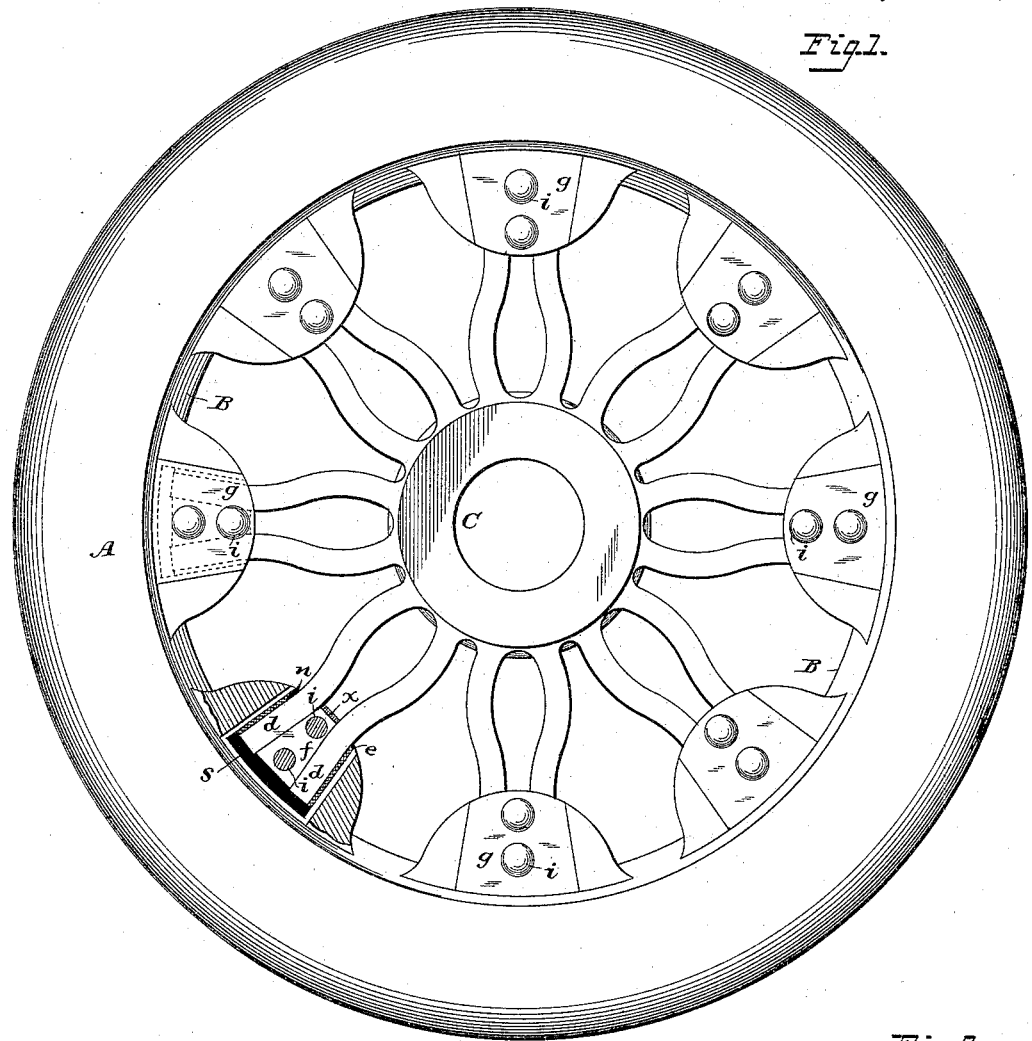
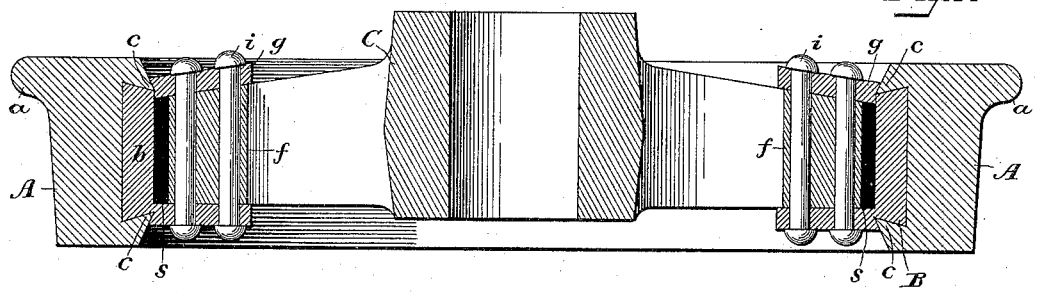
Attest:
Court A. Cooper.
K. C. Hansmann.
John K. Sax,
Inventor:
By Foster & Freeman
Attorneys.

(No Model.) 2 Sheets—Sheet 2.

J. K. SAX.
CAR WHEEL.

No. 319,511. Patented June 9, 1885.

Attest:
Court. A. Cooper.
K. G. Hansmann.

Inventor:
John K. Sax,
By Foster & Freeman
Attorneys.

UNITED STATES PATENT OFFICE.

JOHN K. SAX, OF PITTSTON, PENNSYLVANIA.

CAR-WHEEL.

SPECIFICATION forming part of Letters Patent No. 319,511, dated June 9, 1885.

Application filed January 19, 1885. (No model.)

*To all whom it may concern:*

Be it known that I, JOHN K. SAX, a citizen of the United States, and a resident of Pittston, in the county of Luzerne and State of Pennsylvania, have invented certain new and useful Improvements in Car-Wheels, of which the following is a specification.

My invention is a car-wheel constructed, as fully set forth hereinafter, so as to secure an effective union of the body portion and rim or tire without expensive forgings in the construction of the latter, and also to avoid the objections incident to the employment of rigid wheels.

Figure 3:
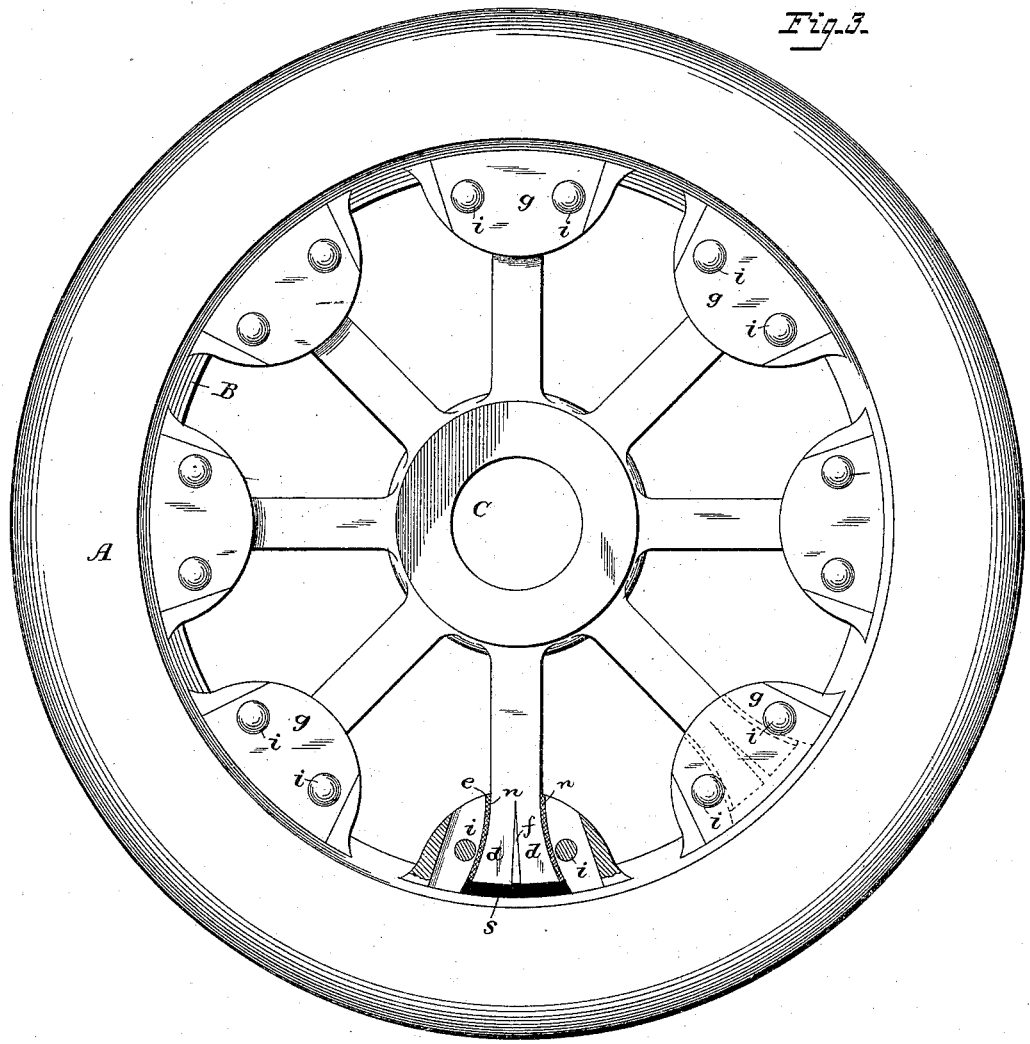
Figure 4:
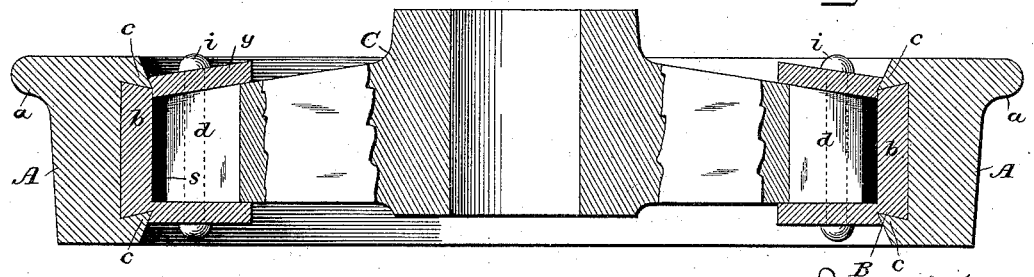

In the accompanying drawings, Figure 1 is a side view of my improved wheel with parts detached and other parts in section, and illustrating one mode of constructing the body portion. Fig. 2 is a transverse section of the wheel shown in Fig. 1. Fig. 3 is a view showing a modification, and Fig. 4 is a cross-section of Fig. 3.

The rim A of the wheel may be of steel or iron, and may be cast or hammered or rolled into shape, and is provided at one outer edge with the usual flange, $a$, and at the inner side with a continuous dovetailed recess or with a series of dovetailed recesses at equal distances apart, formed by parallel flanges $c\ c$, arranged at the opposite edges and with inclined inner faces, as shown.

The inner rim, B, consists of cast metal, which is cast in contact with the outer rim, A, so that a portion or portions, $b$, of the inner rim will enter the recess or recesses in the outer rim, the two parts being fused together, and to this inner rim is detachably connected the body C of the wheel, as will be set forth hereinafter.

In the manufacture of the wheel I first make the outer rim or tire, and then prepare the mold in which to cast the inner rim, said mold being provided with an annular space to receive the outer rim, and with a space or spaces or recesses corresponding to the form of the inner rim or section. The outer rim is then suitably heated, placed in proper position within the mold, which is then closed, and molten metal is poured into the mold, thereby casting the inner rim in direct contact with the outer rim, causing an intimate welding or fusion of the two together, so as to form, practically, but one part.

The inner rim is provided with recesses adapted to receive the outer portion of the body, and with cap-pieces between which and the inner rim such portions of the body are clamped.

The body or center may be either a continuous plate or plates, or a hub provided with solid or divided spokes, as shown in Figs. 1 and 3.

When the center is provided with spokes, the latter having flaring or expanded ends, and the recesses or sockets $x$, in the inner rim are adapted to receive such ends, but are somewhat larger than the latter, and are covered by the cap-pieces $g$, which may be secured in position by bolts or rivets $i$.

When the spokes are solid, they are split to form two contiguous fingers, $d\ d$; but when they are divided or consist of two contiguous bars, as shown in Fig. 1, the ends of such bars form the fingers, which are bent outward to constitute the desired expanded ends. In either case there are recesses $e$ between the sides of the fingers or ends of the spokes and the adjacent sides of the recesses $x$, in which are inserted rubber or other elastic packings $n$, and wedges $f$ are driven between the fingers $d\ d$, so as to separate the latter and compress the packings $n$.

As the ends of the spokes do not extend to the ends of the recesses $x$, there are left spaces $s$ in which I insert packings or fillings of rubber, oakum, wood, or other suitable material, after which the cap-pieces $g$ are applied, so as to clamp the ends of the body portion firmly to the inner rim.

The inner rim or section may consist of separate pieces, each fused at one point to the tire or outer rim; but I prefer to make the inner rim of one continuous annular piece adapted to a continuous annular groove within the outer rim, the side flanges, $c\ c$, of which afford wide bearings, resisting any thrust tending to laterally displace the outer rim or tire, and imparting greater strength to the latter portion of the wheel. The groove formed by the flanges $c\ c$, while it is preferably dovetailed, may have parallel or outwardly-inclined sides or edges, the two rims being so thoroughly fused together as to form practically one piece, rendering the dovetailing unnecessary, except to insure connection in case the weld should be defective at any one point.

By making the sockets or recesses for the reception of the edge or ends of the body portion of cast metal I am enabled to cheaply fit the body to the rim of the wheel, while by fusing the cast-metal section to an outer rim of forged metal I am enabled to secure the advantages of using the latter without the expense which would result from forging the entire rim with recesses adapted for connection to the body portion.

By providing the rim with recesses adapted to receive the edge or ends of the body portion, and by compressing packings between the two and securing them by means of detachable cap-plates, I secure great elasticity, and a secure connection of the parts, with ability to disconnect them whenever it may be necessary for repairs or repacking.

Without limiting myself to the precise construction and arrangement of parts shown and described, I claim—

1. A car-wheel consisting of a flanged recessed rim or tire, an inner rim of cast metal, fused or welded to the outer rim, and a body peripherally connected to the inner rim, and formed of a separate piece or pieces, substantially as set forth.

2. The combination in a car-wheel, of an outer and inner rim, of different metals fused together, and a detachable body portion, consisting of a separate piece or pieces fitted and clamped to the inner rim, substantially as set forth.

3. The combination of the outer and inner rims, consisting of different metals fused together, a body peripherally fitted to the inner rim, and intervening packings, substantially as specified.

4. The combination, in a car-wheel, of an outer forged recessed rim, an inner rim or section provided with recesses or sockets, and a body portion provided with arms or spokes fitted to said sockets and secured by clamping-plates, substantially as specified.

5. The combination of the outer and inner rims, fused together, and the detachable body having spokes with expanded ends and adapted to sockets or recesses in the inner rim, and a removable-cap piece or pieces clamping the body and inner rim together, substantially as specified.

6. The combination, with the rim having sockets expanding towards the periphery and body having arms terminating in fingers adapted to said sockets, of side packings and wedges fitting between the fingers to compress the packings, substantially as set forth.

7. The combination, with the outer forged rim and a detachable body provided with spokes having expanded ends, of an inner cast-metal rim fused to the outer rim and provided with recesses and attachments for the ends of the spokes, substantially as set forth.

In testimony whereof I have signed my name to this specification in the presence of two subscribing witnesses.

JOHN K. SAX.

Witnesses:
FRANK P. REAP,
FRANK C. MOSIER.